(12) United States Patent
Mantyla (10) Patent No.: US 10,989,336 B2
(45) Date of Patent: Apr. 27, 2021

(54) FIRE STOP AND METHOD OF MAKING THE SAME

(71) Applicant: Canplas Industries Ltd., Barrie (CA)

(72) Inventor: James Mantyla, Barrie (CA)

(73) Assignee: CANPLAS INDUSTRIES LTD, Ontario (CA)

( * ) Notice: Subject to any disclaimer, the term of this patent is extended or adjusted under 35 U.S.C. 154(b) by 141 days.

(21) Appl. No.: 16/251,229

(22) Filed: Jan. 18, 2019

(65) Prior Publication Data

US 2019/0226609 A1 Jul. 25, 2019

(30) Foreign Application Priority Data

Jan. 19, 2018 (CA) .................................. CA 2992334

(51) Int. Cl.
| | |
|---|---|
| *F16L 5/04* | (2006.01) |
| *A62C 2/06* | (2006.01) |
| *C04B 38/00* | (2006.01) |
| *C04B 38/02* | (2006.01) |
| *C04B 40/06* | (2006.01) |
| *C04B 111/00* | (2006.01) |
| *C04B 111/28* | (2006.01) |

(52) U.S. Cl.
CPC ................ *F16L 5/04* (2013.01); *A62C 2/065* (2013.01); *C04B 38/0067* (2013.01); *C04B 38/02* (2013.01); *C04B 40/065* (2013.01); *C04B 2111/00663* (2013.01); *C04B 2111/28* (2013.01)

(58) Field of Classification Search
CPC ........ F16L 5/04; A62C 2/065; C04B 38/0067; C04B 38/02; C04B 40/065; C04B 2111/00663; C04B 2111/28; F16J 15/02; F16J 15/022
See application file for complete search history.

(56) References Cited

U.S. PATENT DOCUMENTS

| | | | |
|---|---|---|---|
| 2,052,845 | A | 9/1934 | Raaber |
| 2,111,545 | A | 3/1938 | Bassett |
| 2,117,589 | A | 5/1938 | Armstrong |
| 2,319,876 | A | 5/1943 | Moss |
| 2,331,099 | A | 10/1943 | Anderson |
| 2,351,262 | A | 6/1944 | Hahn |
| 2,354,220 | A | 7/1944 | Pelouch |
| 2,357,993 | A | 9/1944 | Blau et al. |

(Continued)

FOREIGN PATENT DOCUMENTS

WO    WO 03/000823 A1    1/2003

*Primary Examiner* — Gilbert Y Lee
(74) *Attorney, Agent, or Firm* — Fay Sharpe LLP (57) ABSTRACT

A fire stop device having a body having a through bore and the body being sized and shaped to be positioned within an opening in a wall. the body is made from a moldable a thermoplastic resin having a blowing agent suspended therein. The blowing agent has a predetermined gas release temperature and the thermoplastic resin has a melting temperature above the predetermined gas release temperature of the blowing agent; wherein when exposed to a fire the blowing agent first begins to release gas and the resin softens as the resin is heated until the resin is soft enough for the released gas to expand the plastic to form a foam to close said through bore before a char is formed on said expanded body by said fire. A method of forming a fitting having the blowing agent suspended therein is also provided.

20 Claims, 7 Drawing Sheets

(56) References Cited

U.S. PATENT DOCUMENTS

| | | | |
|---|---|---|---|
| 2,422,796 A | | 6/1947 | Monroe et al. |
| 2,686,244 A | | 8/1954 | Dahm et al. |
| 4,719,249 A | | 1/1988 | Dietlein et al. |
| 4,788,800 A | | 12/1988 | Whiteley |
| 5,105,592 A | | 4/1992 | MacMillan et al. |
| 5,257,641 A | | 11/1993 | Elsbury et al. |
| 5,347,767 A | | 9/1994 | Roth |
| 5,498,466 A | | 3/1996 | Navarro et al. |
| 5,634,304 A | * | 6/1997 | Sakno ................ F16L 55/1026 52/232 |
| 6,153,668 A | | 11/2000 | Gestner et al. |
| 6,153,674 A | | 11/2000 | Landin |
| 6,336,297 B1 | * | 1/2002 | Cornwall ................ F16L 5/04 277/615 |
| 6,521,834 B1 | | 2/2003 | Dykhoff et al. |
| 6,642,284 B2 | | 11/2003 | Thewes et al. |
| 2015/0376062 A1 | | 12/2015 | Reid et al. |

\* cited by examiner

FIRE STOP AND METHOD OF MAKING THE SAME

FIELD OF THE INVENTION

This invention relates generally to the field of fire control products. More particularly, this invention relates to a fire control product called a fire stop which is used to try to prevent fires from propagating from room to room through pipe openings in the internal walls of a building. Such pipe openings may be present to allow plastic plumbing piping to pass directly through the wall. A fire stop is intended to prevent such pipe openings from allowing fires to propagate through the walls, once the pipe is consumed by the fire.

BACKGROUND OF THE INVENTION

Modern building codes require use of certain designs and fittings to limit the damage which may be caused by a fire in a room in a building. One type of fire prevention product is a sprinkler system which has sprinkler heads attached to a water supply to apply water inside a building in the event of a fire. The water can help dampen the fire.

Other fire prevention devices are designed to prevent fire from propagating through walls. In some cases, depending upon the structure and room type, the wall material may have to be made with a certain level of fire resistant material. Even then, of concern are the openings formed in walls to accommodate plumbing and the like. If the walls themselves are made fire resistant using appropriate materials, openings to accommodate plastic plumbing pipes may still provide a pathway for the fire to jump past the fire resistant walls into an adjacent room, once the pipe is consumed by the fire. Essentially the plastic plumbing pipes once consumed leave the opening clear and may provide a gateway for the fire to pass across the wall. This can allow the fire to propagate through a building from room to room and is highly undesirable, as it makes putting out the fire and controlling the extent of the damage much more difficult.

Consequently, modern building codes require the use of fittings called fire stop fittings. These fittings are positioned in the openings in the walls. In general, when exposed to the heat of the fire these fittings expand to close off the plumbing pipe and ideally remain unconsumed to try to block the fire from propagating through the wall opening.

Many prior patents exist directed to various methods and products for fire stops. Although simple in concept, a number of different functions must be brought together in a single device. These functions include that the fire stop can easily be connected to standard plumbing piping on either side of the wall by means of appropriate bell or spigot fittings. For cost and compatibility reasons it is preferred to mold the fire stop from moldable plastic. The plastic needs to be able to expand to block the opening in the wall when exposed to the heat of the fire. The plastic material in addition to expanding when exposed to heat must provide some fire resistance to prevent the expanded fire stop from being consumed in the fire and thereby leaving a path open for a fire to propagate through the wall.

A fire stop device typically surrounds PVC piping passing through walls or floors, and includes an intumescent material which expands when the temperature increases to a certain level due to the heat of the fire. When exposed to high heat, the PVC pipe softens and begins to melt. The expansion of the intumescent material is directed inwardly towards the pipe, and is supposed to crush the pipe to close off the opening in the wall or floor with a hardened char, thus preventing the spread of the fire.

A problem to overcome is to provide a fire stop containing an intumescent material the expands strongly enough to collapse the PVC pipe, after it has begun to char. Expansion of the intumescent material does not typically occur before the charring process begins. Char is a rigid material which is not easy to expand.

Prior art attempts to meet these competing design requirements has resulted in attempts to provide sophisticated compositions and complex molding techniques to provide a fire stop with appropriate functionality. This has the effect of increasing the cost of the fitting considerably. Examples of the prior art attempts to provide a type of fire stop can be found below:

U.S. Pat. No. 2,052,845
U.S. Pat. No. 2,111,545
U.S. Pat. No. 2,117,589
U.S. Pat. No. 2,319,876
U.S. Pat. No. 2,331,099
U.S. Pat. No. 2,351,262
U.S. Pat. No. 2,354,220
U.S. Pat. No. 2,357,993
U.S. Pat. No. 2,422,796
U.S. Pat. No. 4,686,244
U.S. Pat. No. 4,719,249
U.S. Pat. No. 4,788,800
U.S. Pat. No. 5,105,592
U.S. Pat. No. 5,257,641
U.S. Pat. No. 5,347,767
U.S. Pat. No. 5,498,466
U.S. Pat. No. 6,153,668
U.S. Pat. No. 6,153,674
U.S. Pat. No. 6,521,834
U.S. Pat. No. 6,642,284
United States Patent Publication No. US2015/0376062
Intl Patent Application No. WO 03/000823 A1
A different solution is desired.

SUMMARY OF THE INVENTION

What is desired is a plastic molded plumbing fitting which may be used as a fire stop. In the normal condition the plastic molded fitting of the present invention may provide the usual flow through plumbing connection for plumbing pipes passing through an opening in a wall. In the case of a fire the present invention may provide a barrier to close the flow through plumbing opening through the wall or floor to reduce the risk that fire will propagate through the opening from one room of a building to the next.

The present invention may provide a thermoplastic fitting made from a plastic material having a predetermined melt temperature which is the temperature at which the plastic is molded into the shape of the final fitting. The preferred shape can be as desired to interface with other plumbing products such plastic pipes, and can include appropriate bells or spigots as required and can be provided in the appropriate thickness and diameters to make a waterproof joint with the adjacent plastic pipe according to code or other building regulations. In one embodiment, the present invention can comprise a double bell ended fitting with a middle body portion sized to fit within a wall opening. In one embodiment it is preferred if the middle portion acts as the pipe and that there is no further pipe internal to the middle portion.

In one aspect of the invention at least the middle portion of the plastic body can be molded with a blowing agent which has a predetermined gas release temperature, or in some cases the whole fitting can be formed from the mixture of blowing agent and plastic. The blowing agent may be of the type that releases gas as it is heated above a gas release temperature. Most preferably the gas release temperature is below the molding or melt temperature of the thermoplastic and below a char temperature. Between the melt temperature and the char temperature the released gas causes the resin to foam and expand. In one embodiment, the blowing agent can be mixed in with the heated thermoplastic prior to molding without the blowing agent expanding by providing an overpressure during the heated molding steps. In one preferred embodiment the molding process may be conducted at a predetermined pressure, wherein the predetermined pressure is higher than the release pressure of the blowing agent at the temperature range of usual molding temperatures. In this way, if a molding step temperature of the thermoforming machine exceeds the blowing agent gas release temperature then the blowing agent will remain unexpanded, due to the overpressure. Most preferably the blowing agent gas release temperature is a temperature higher than the preferred molding temperature. Once formed, the part can be allowed to cool, in which case the solid plastic body, in combination with a lower temperature than the melt or molding temperature will allow the blowing agent to remain inactive or dormant.

In a further aspect the thickness of the plastic body plastic is sufficient, having regard to the amount of blowing agent, across the middle portion of the fitting, to allow the combination to expand to fully close off the through bore through the fitting. This may be expressed as the blowing agent having an expansion factor of x, and the through bore having a radius of R, wherein the thickness T of the main body of the part is such that TX>R. In this way once the blowing agent is activated and the thermoplastic expands towards the middle the through bore will be closed. Although various expansion factors can be used a preferred range of expansion factor is between 3 times to 5 times the original thickness.

In a further aspect the plastic resin may be of the type that naturally chars to avoid having to add a separate charring agent, such as PVC. In a preferred form the PVC is the same plastic as is used for the DWV so that there is no noticeable colour difference. This does not detract from the workability of the plastic resin during thermoforming by avoiding having to try to mold with a mixture of plastic and some other material, such as exfoliated carbon. Also, it removes the problem on nonhomogeneous mixtures which can create an uneven response of various parts of the fitting to a fire.

Therefore, according to one aspect, the present invention provides a fire stop device comprising: a body having a through bore and being sized and shaped to be positioned within an opening in a wall, said body being made from a moldable a thermoplastic resin having a blowing agent suspended therein, said blowing agent having a predetermined gas release temperature and said thermoplastic resin having a melting temperature above the predetermined gas release temperature of the blowing agent; wherein when exposed to a fire said blowing agent first begins to release gas and the resin softens as the resin is heated until the resin is soft enough for the released gas to expand the plastic to form a foam to close said through bore before a char is formed on said expanded body by said fire.

In another aspect the present invention provides a method of forming a fire stop fitting comprising the steps of: adding a blowing agent to a thermoplastic material; heating the mixture under pressure to permit the blowing agent to be dispersed within the melted thermoplastic, extruding the melted combination through a spring nozzle into a pressurized mold; forming a fire stop fitting in said mold, curing said fitting under pressure within said mold and releasing said fitting from said mold and said pressure only after said fitting is substantially cured.

BRIEF DESCRIPTION OF THE DRAWINGS

Reference will now be made by way of example only to preferred embodiments of the invention by reference to the following drawing in which.

DETAILED DESCRIPTION OF THE PREFERRED EMBODIMENTS

Figure 1:
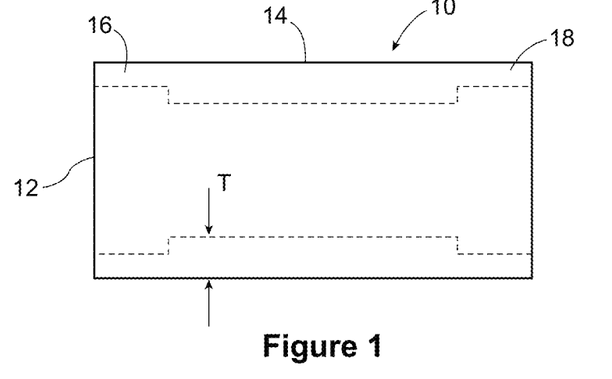
FIG. 1 is a view of a fitting according to the present invention.

FIG. 1 shows a fitting 10 made according to the present invention. The fitting 10 includes a body 12 having a middle portion 14 with bell ends 16 and 18. The middle portion may have a wall thickness T as shown. The present invention comprehends that various shapes and forms of fitting can be used including one that has spigot ends or one that is in the form of a simple sleeve that transits through the opening in a wall. In this specification, intumescent means a material that expands as it is heated.

Figure 2:
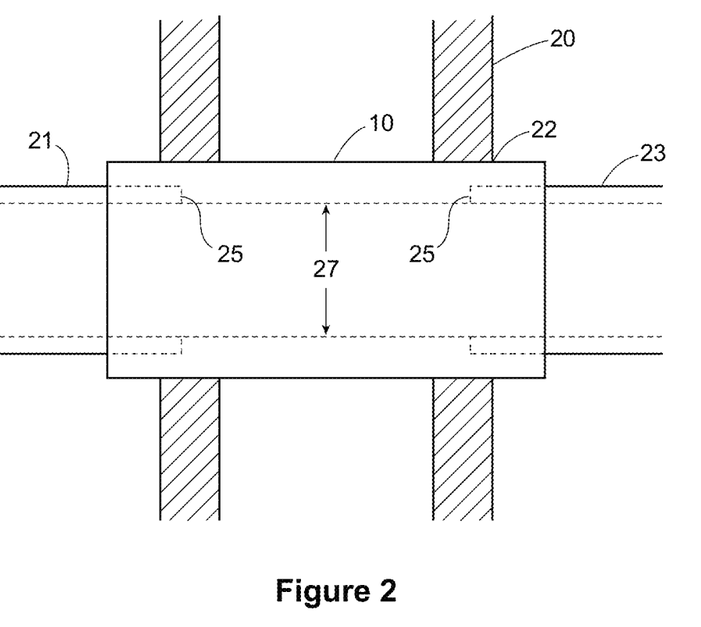
FIG. 2 is a cross sectional view of the fitting of FIG. 1 in place in an opening in a wall.

FIG. 2 shows the fitting 10 in place in a wall 20 having a wall opening 22. As shown the fitting 10 extends outwardly from both sides of the wall with an appropriate pipe connection for pipe sections 21, 23. The pipe sections may fit into the shoulders 25 of the fitting in the usual manner. This forms a through bore 27. The wall 20 will be any typical wall and may include fire proof materials according to local building codes.

Figure 3:
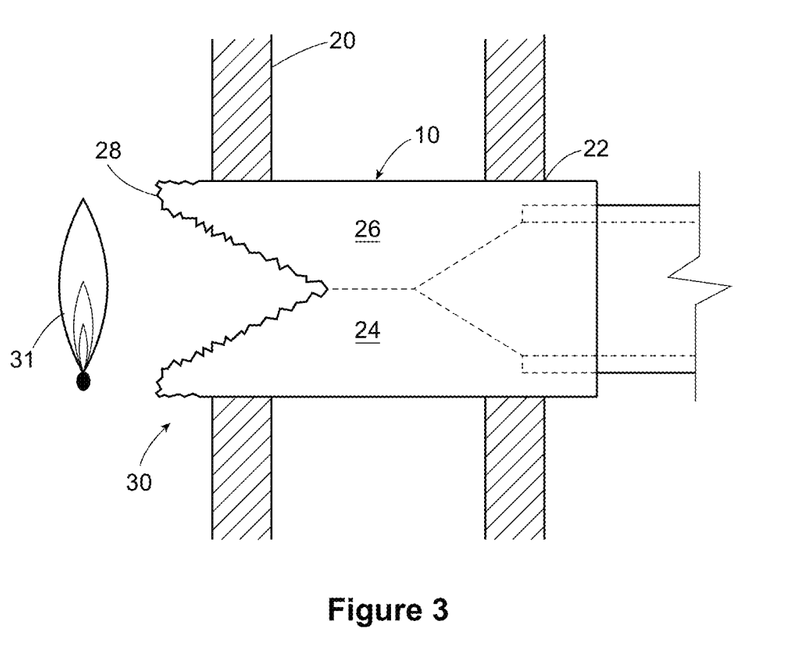
FIG. 3 is a view of the present invention after being exposed to a source of heat such as a fire in an expanded state.

FIG. 3 shows the fitting 10 after it has been exposed to heat, such as from a fire. As shown the wall thickness T has expanded at 24, 26 and preferably have closed off the open bore altogether. The expansion has been more significant on the side 30 facing the fire 31. After the wall material has foamed and expanded, the fire facing surface will char as shown by the layer 28.

Figure 4:
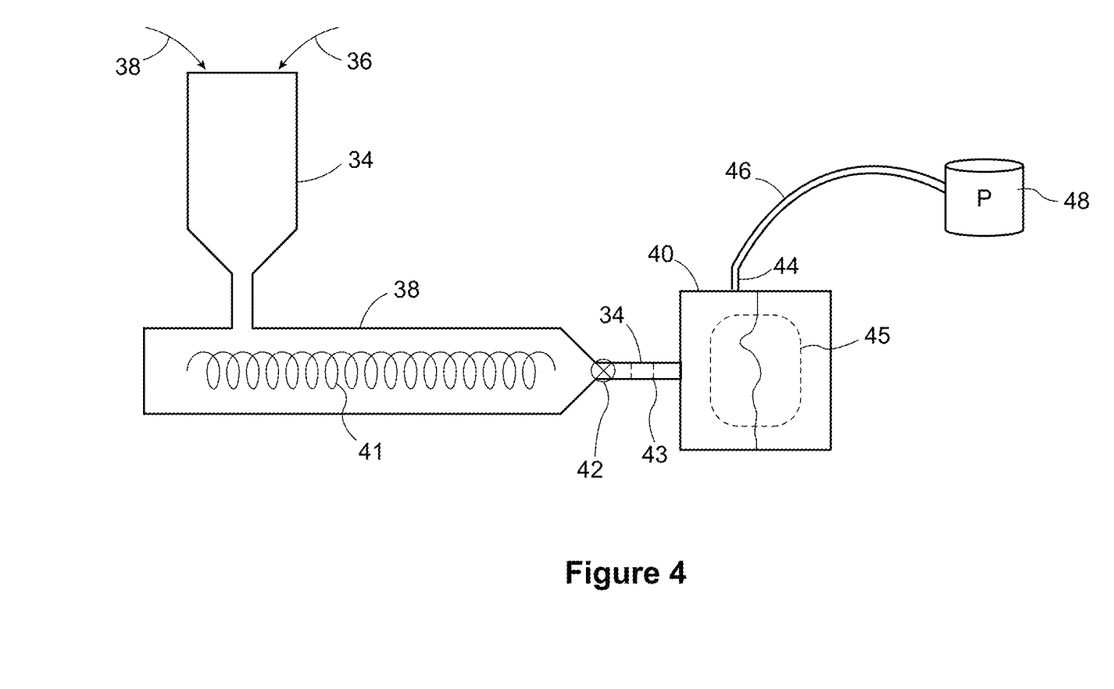
FIG. 4 is a view of a molding apparatus according to the present invention showing a pressure maintenance system.

FIG. 4 shows a schematic of a molding apparatus which may be used according to the present invention. There is a hopper 32 into which fire resistant PVC pellets 34 and the blowing agent 36 may be added. In the preferred embodiment the blowing agent is a dry powder which readily mixes in with the plastic. A preferred blowing agent is baking soda which may be added in a ration of between 2% and 5% by weight. Reasonable results can be achieved with the ratio at about 2% to 3%. The mixture is fed into the extruder 38 where the plastic is melted and mixed and advanced by means of a positive displacement device such as a screw towards the mold 40. Between the extruder and the mold is a nozzle 42. This valve 42 ensures that the pressure inside of the extruder is maintained above the gas release pressure for the blowing agent at the molding temperature. Thus, as the extruder 38 advances the plastic mixture towards the mold 40, the pressure will build up to the level set by the spring nozzle 42. In this way the blowing agent can be kept inactive during this step of the molding process.

Although this apparatus has much in common with a conventional molding apparatus there are few features which are significant. For example, a spring nozzle 42 is provided for the extruder 38. This spring nozzle 42 is sized and shaped to remain closed when the extruder 38 is mixing and melting resin. The extruder 38 in a preferred embodiment may be retracted from contacting the sprue bushing of the mold at this stage as shown by dashed lines 39. This allows the extruder 38 to maintain a barrel pressure that is higher than the foaming pressure of the preferred blowing agent.

Turning now to the mold 40, it preferably has been modified to have the mold vent 44 connected to an airline 46. The airline attaches to a source of pressurized air 48, such as shop air pressure, which may be set at about 100 psi. This 100 psi pressure has been found to be higher than the foaming pressure of the blowing agent for this resin. More or less pressure can be provided, but this amount has provided reasonable results for a PVC melt. All that is required according to the present invention is that the air pressure supplied is above the foaming pressure for the blowing agent at the temperatures of the molding step. This is so that the blowing agent does not release gas at this step and so is able to release gas when heated at a later time, as explained in more detail below.

In terms of the molding sequence, to make a fitting according to the present invention, once the injection screw 41 has retracted and there is a full shot of plastic material ahead of it, the extruder 38 advances the plastic forward towards the mold 40. Then the extruder 38 contacts a mold sprue bushing 43 and the spring nozzle 42 opens. Since the closed mold 40 is also pressurized to the preferred pressure of 100 psi the melt material can't foam as it is injected into the mold cavity 45. The blowing agent remains intact and inactivated within the plastic melt as the part cools to a solid cross section. Once the part is cooled, the blowing agent is trapped in solution within the body 12 of the fitting 10.

Figure 5:
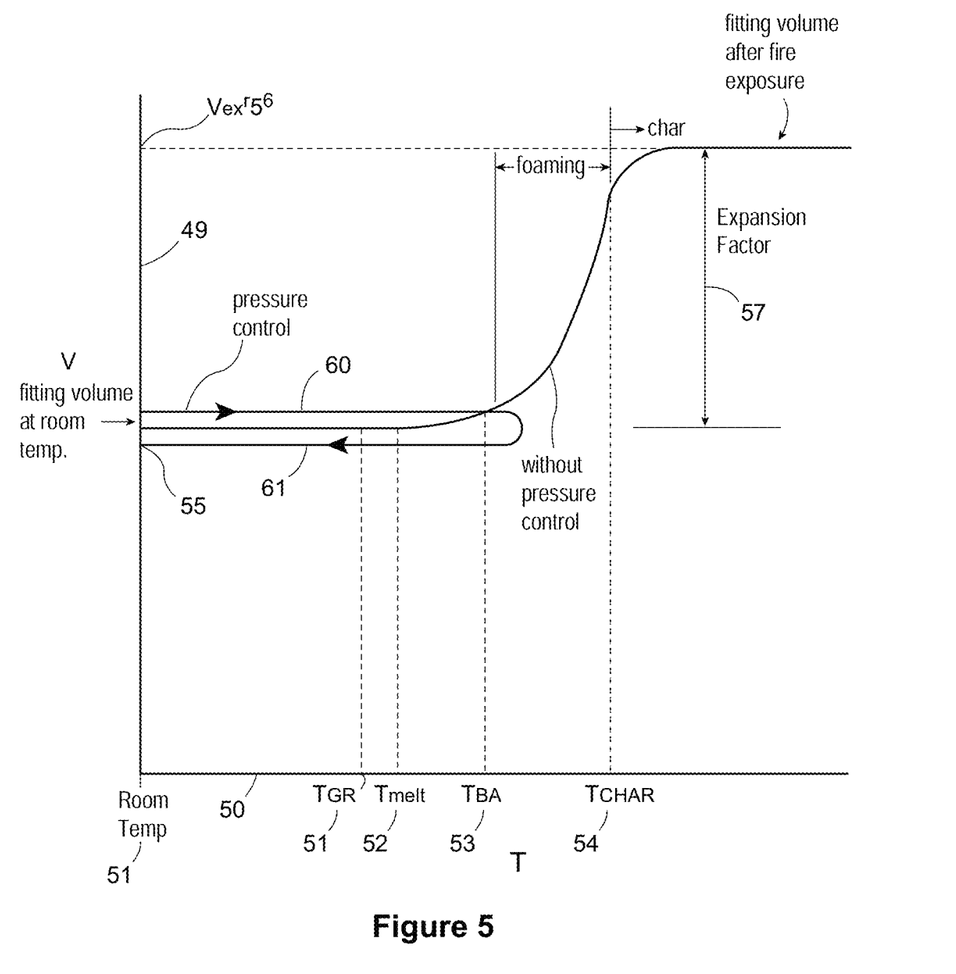
FIG. 5 is a graph showing the pressure vs temperature for the present invention.
Figure 6:
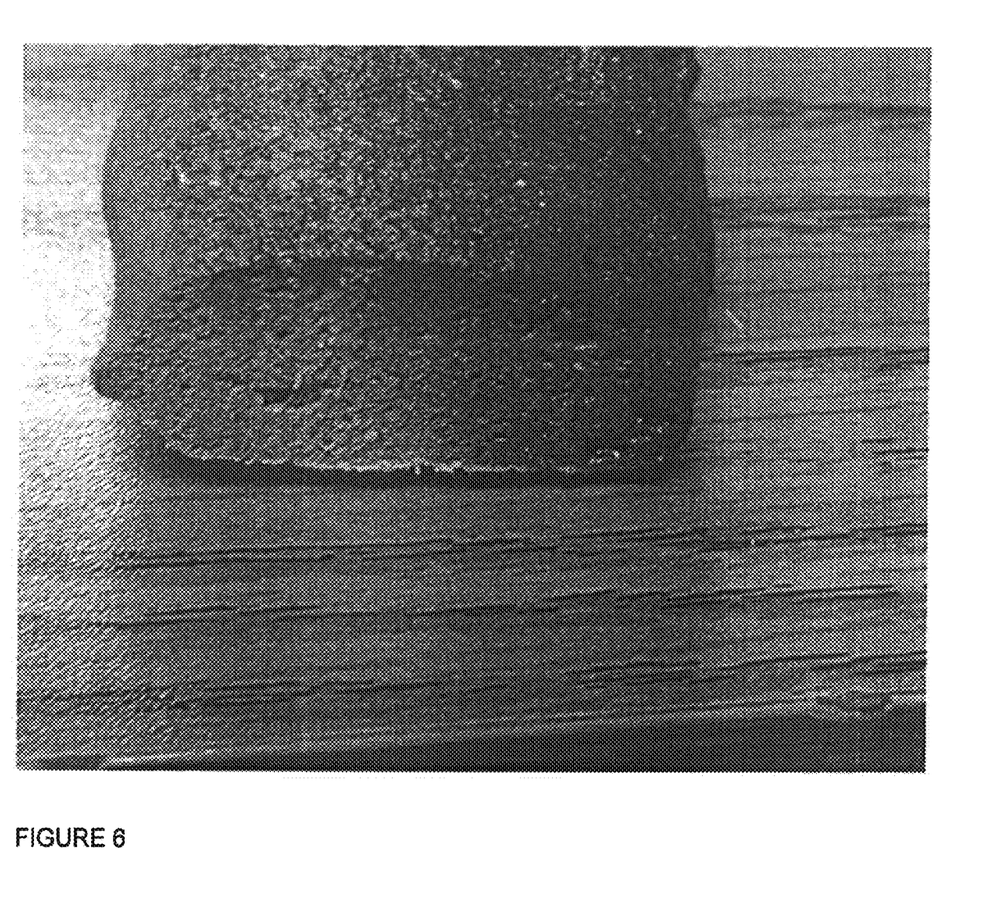
FIG. 6 is a photograph of a sample of PVC formed according to the present invention after being exposed to a source of heat.

FIG. 5 is a graph which shows schematically the sequence of steps of the present invention. The y axis 49 represents volume and the x axis 50 represents temperature. The origin of the x-axis 51 is at room temperature. Along the x axis are shown Tgr 51 which is the temperature at which gas is first released from the blowing agent, Tmelt 52, which is the melt temperature for the resin, Tba, 53 which is the start of the foaming temperature range for the blowing agent and Tchar, 54 which is the temperature at which the plastic chars and forms an outer char layer. Along the y-axis is shown Vn, 55 which is the normal volume of the molded part and Vex 56, which is the expanded volume of the charred material. The expansion factor 57 is the difference between Vn and Vex.

The line 60 to 61 describes the characteristics of the molded plastic during the molding steps. As previously described preferably this happens under a pressure control and as a result there is no change in volume, even though the resin is being heated at 60 and then cooled as a molded fitting at 61. As can now be appreciated, due to the pressure control which is maintained as the resin is being cooled in the shape of the desired fitting, there is no change in volume. Then the cooled fitting may be removed from the mold and the pressure control, and placed into the field, where there is no pressure control. When exposed to a source of heat, such as a fire, the heating of the fitting will first cause the plastic to reach the melt temperature, at which time the blowing agent will begin to try to release gas. A further temperature rise will soften the plastic even more and increase the driving force for the blowing agent to release gas. This process continues until the gas has enough pressure and the plastic is soft enough to allow the gas to foam the molten plastic of the fitting. As the gas expands and the plastic becomes more molten the foaming will have the effect of allowing the gas to expand the volume of the walls of the fitting. In other words, the fitting walls will begin to expand. Provided the original thickness T and the amount of blowing agent added to the plastic melt is sufficient, then the expansion can block off the through bore through the fitting. Thus, it is preferred if the expansion takes place until the whole open bore of the fitting is closed off. In this sense 'closed off' means that the fire cannot propagate through the pipe opening and in this specification the term 'to close off' means simply that the opening is substantially fire proof. A preferred expansion factor is between 3 to 5 times the original volume, but other amounts can also be used. What is desired is that the wall thickness is wide enough, having regard to the expansion factor and the bore size to block off the open bore once the expansion has taken place. The sequence of events of the preferred invention is to be exposed to heat to allow the plastic to begin to soften; then the blowing agent begins to release gas as the plastic further softens; the mixture foams when the plastic is soft enough that the gas pressure is strong enough to cause the foaming; this foaming is what causes the expansion of the walls of the fitting to close off the opening; then as the flame front advances the expanded PVC will char to create a solid fire barrier.

It can now be appreciated that by having the fitting made out of the simple combination of blowing agent and fire resistant PVC as described, the molded fitting can be part of the water system and come in direct contact with the water. Unlike some of the prior art solutions, which are collars which sit over top of the conventional water pipes, this fitting can be in line with the water piping system itself. Thus, the expansion of the walls can be quite gentle in that it is not required that the expansion of the material have enough force to pinch off a pipe which may otherwise still be in place. Since the present invention comprehends a composition that is very workable, since the only additive is the blowing agent, fittings of acceptable quality and appearance can be made. Some of the prior art compositions are so difficult to work with that the end products are too rough and unfinished in appearance to be used in this way.

Figure 7:
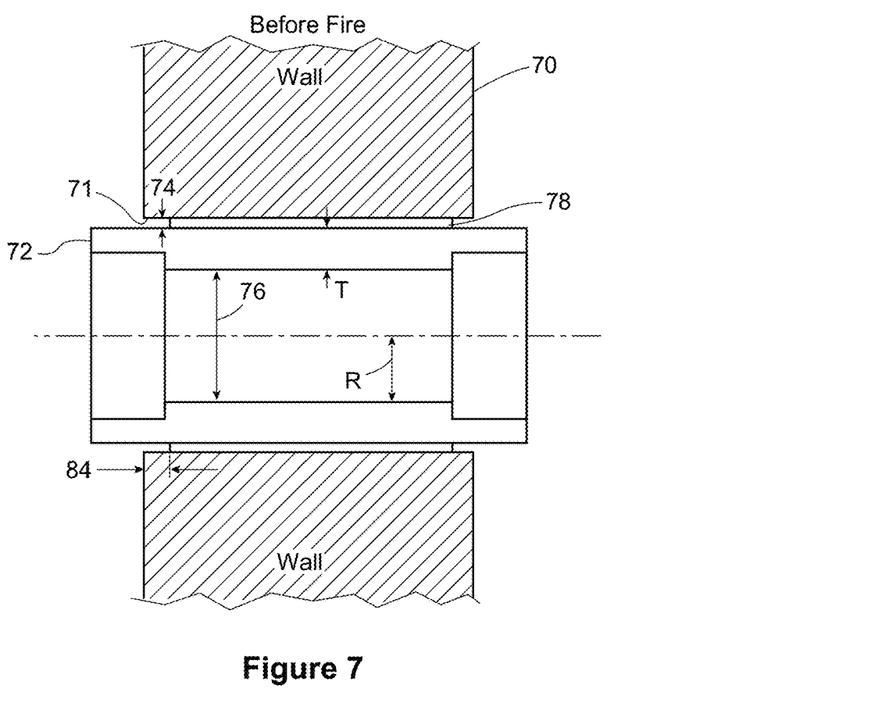
FIG. 7 is a further view of an alternate embodiment of the present invention including an expansion directing collar.

FIG. 7 shows a further embodiment of the fitting of the present invention in place within a wall 70. As can be seen in some installations the wall opening 71 may be larger than the size of the fitting 72, which creates a gap 74. The fitting 72, upon being exposed to heat may therefore expand outwardly as well as inwardly which could mean that the through bore 76 is not effectively closed off. Alternatively, the expansion of the fitting only inwardly may leave a gap around the outside of the fitting 72 which could allow the fire to get through the wall 70 through the gap 74. Therefore, there is a desire to control the expansion of the fitting 72 upon the fitting 72 being exposed to a fire to ensure that the fitting closes off both the inner bore 76 and the outer gap 74. The present invention provides an expansion directing sleeve 78 for this purpose. The sleeve 78 may be made from a fire-resistant material such as metal for example, or of from a material like Ultem or Ryton. The present invention comprehends that the sleeve 78 could be added to the fitting during the molding of the fitting or after the fitting has been removed from the mold and is already substantially cured. In this specification substantially cured means that having regard to the temperature of the thermoplastic fitting the plastic has enough structural integrity to prevent the blowing agent from releasing gas and expanding the plastic composition to distort the shape of the fitting.

Figure 8:
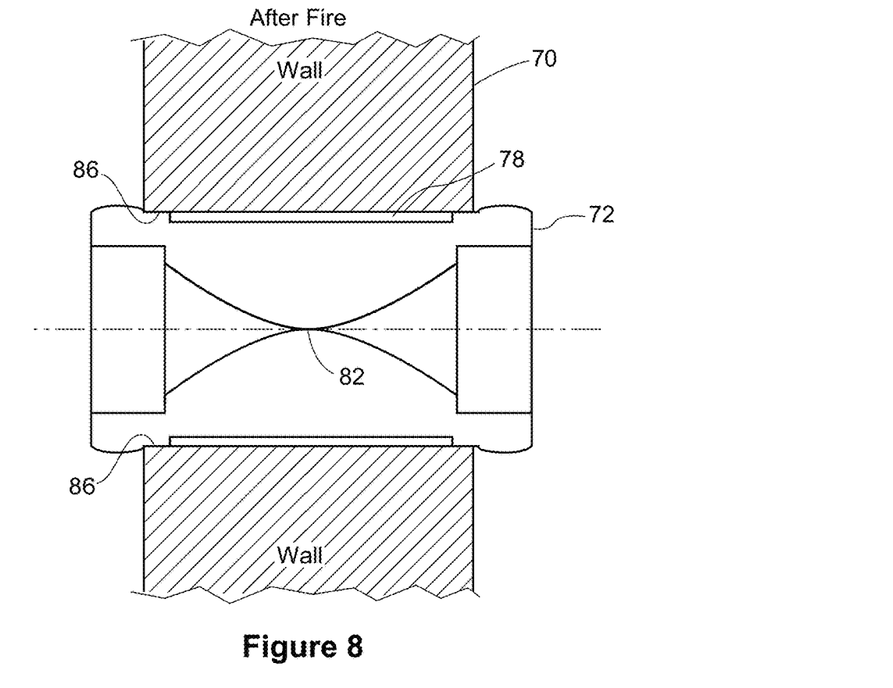
FIG. 8 is a view of the embodiment of FIG. 7 after it has been exposed to heat and expanded.

FIG. 8 is a view of the fitting of FIG. 7 after being exposed to a fire. It can now be understood how the sleeve 78 may be used. Since the sleeve 78 will not expand to any appreciable degree with any fire related temperature change, it will force the inner wall 80 to expand inwardly to close off the open bore through at least a portion of the fitting which is surrounded by the sleeve, such as at 82 assuming that the fitting wall thickness T is appropriate for size of the inner diameter R and for a given expansion factor X. Also, the sleeve preferably is shorter in length than the length of the barrel of the fitting leaving an exposed region 84, meaning that the fitting material can expand outwardly where it is exposed to the heat from the fire but is located beyond the expansion directing sleeve, at 86. In this way the opening is sealed outwardly against the wall at the ends, and inwardly through the through bore through the middle of the fitting at 82, blocking the propagation of any fire through the wall opening 70, either through the fitting or around the fitting through the original wall gap 74.

It will be understood that the present invention comprehends other configurations of fitting and expansion directing sleeve, such as molding the fitting with the sleeve embedded within the main body of the fitting. In this way thermally expanding material can be provided both inside and outside of the sleeve allowing exposure to a fire to cause an expansion both inwardly and outwardly as required. In this configuration care must be taken to ensure that having regard to the thermal expansion factor for that specific plastic blowing agent combination there is enough expanding plastic compound formed within the sleeve to safely close the through bore 76. In summary the present invention comprehends using an expansion directing sleeve 78 in a fitting design which comprehends bother internal expansion to close off the through bore 76 and outward expansion to close any gap 74 which might exist between the outer part of the fitting 72 and the wall opening 70.

Figure 9:
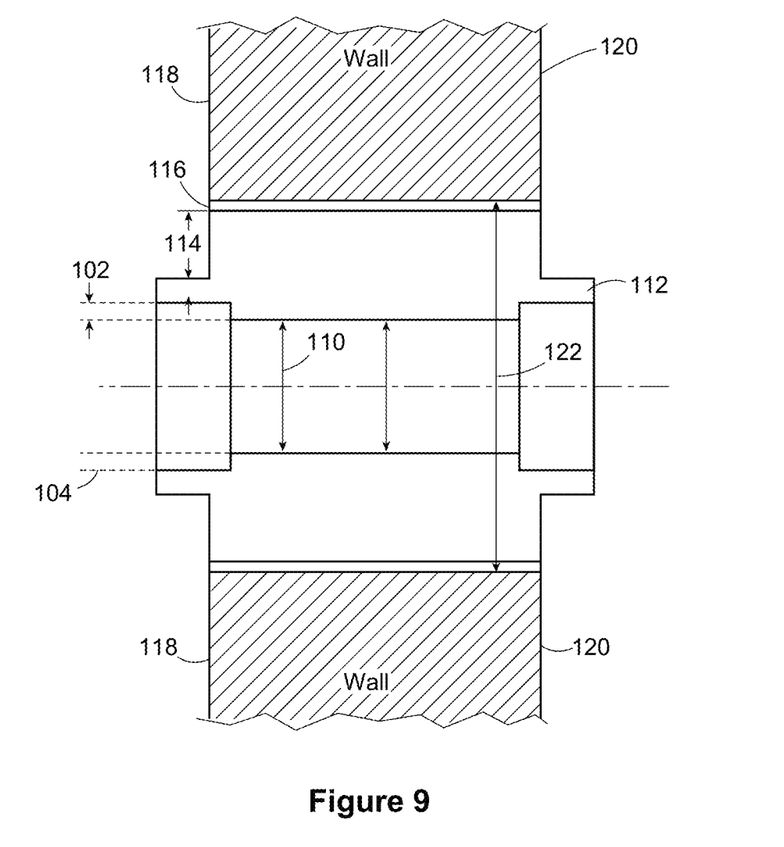
FIG. 9 is a view of alternative embodiment of the present invention.

FIG. 9 is a further embodiment of the present invention, and relates to a situation where the wall thickness 102 of the pipe or conduit 104 is relatively thin. In this embodiment due to for example a building code specification for the size of the internal diameter 110 of the fitting 112, it may not be possible to include enough of an expansion of the fitting to fully close off the pipe diameter 110 without adapting the design of the fitting. FIG. 9 shows an embodiment where the thickness of the fitting 112 has been enhanced at 114. In other words, extra material has been added to the outer diameter of the fitting through the building wall portion so that when it expands it is able to close off the internal diameter 110 of the fitting, even though the pipe wall thickness 102 is relatively thin. Again, an expansion directing sleeve 116 may be used to help direct the expansion inwards to close off the internal diameter. In this embodiment it will be noted that the sleeve 116 is made the same length as the building wall thickness, so it extends from one side 118 of building wall to the other side of the building wall 120. In this embodiment the sleeve 116 fits closely within the wall opening 122, so allowing the fitting some extra length to expand outwardly is not as important as where the sleeve is a much looser fit within the wall opening as in the earlier figures.

The present invention consists of a fire stop that does not require the use of intumescent materials (other than the blowing agent), as well as a method of manufacturing the fire stop so that no intumescent materials are needed. Instead the present invention combines a common thermoplastic, for example, fire proof PVC which has provided reasonable results, with a temperature activated blowing agent to create a fire stop fitting. The preferred invention may include the step of molding the fire stop with a blowing or foaming agent suspended within the molded resin. The molding steps may take place at an over pressure so that the blowing agent is not allowed to expand during the molding process. The preferred blowing agent is one that releases a gas upon being heated to an gas release temperature. The most preferred blowing agent is sodium bicarbonate, a.k.a. baking soda, which will begin to release carbon dioxide gas at temperatures above 80 degrees centigrade.

When exposed to high temperatures, the thermoplastic material used for the fire stop will begin to soften and melt at around 160 degrees C. (320° F.). Even though the blowing agent is activated at about 80 degrees centigrade (176 degrees Fahrenheit), it has been discovered that the gas from the blowing agent remains trapped within the plastic until a higher temperature softens the plastic enough to allow the released gas to have some expansion effect. Essentially, the blowing agent suspended within the PVC resin of the fire stop will release gas but it won't start to foam the plastic until the plastic reaches about 177 degrees C. (350° F.); at this point the plastic in the fitting has become soft enough to expand under the pressure of the gas released from the blowing agent as it warms. Thus, the lower gas release temperature (i.e. the temperature at which gas begins to be released) of the blowing agent as compared to the temperature at which the foaming takes place has a number of beneficial effects, including softening the plastic, driving more of the gas out of the blowing agent as the temperature rises above the gas release temperature and causing the trapped gas to expand as it gets hotter. All of these effects combine to provide the overall expansion factor X. When the blowing agent foams, provided it is sized and shaped well enough having regard to the size of the opening, it will cause the fire stop to expand enough to close off the pipe, before a char is formed. When the fire reaches the fire stop device, the walls may preferably have fully expanded and closed off the pipe. The flames will then cause the outer surface of the expanded fire stop to char and in turn this prevents or blocks the fire from spreading through that wall opening. In a preferred embodiment the blowing agent may be an endothermic compound, meaning that it requires the absorption of heat (energy) to release the gas and to undergo the gas release and then plastic foaming process.

The present invention can now be better understood by those skilled in the art. There is no intumescent material in the fire stop according to the present invention; just a blowing agent and as such the fitting would not be sensitive to water. Further there are no separate charring agents added such as exfoliated carbon or graphite or the like, the use of which makes the plastic melt hard to work and mold and also can damage the molding equipment. Further, the fire resistant thermoplastic PVC material naturally forms the char after closing off the pipe rather than during the expansion phase as in the prior art. This means that the foaming step is not impeded by a char layer which tends to be rigid and fixed in size and shape and which prevents further expansion. The present invention provides for molding the fitting out of flame retardant PVC with a blowing agent in it without allowing the foaming agent to expand or be activated during the molding process. This may be achieved in the present invention by mixing the blowing agent with the pellets before the combination is introduced to the molding machine material hopper and keeping a pressure on the mixture during the process to prevent the release of any gas even if the gas release temperature has been achieved for the melt during the molding process.

The present invention uses a spring loaded shut off nozzle in the press or extruder and when the screw mixes and melts the PVC resin, the pressure in the machine barrel is higher than the foaming pressure of the blowing agent to keep the blowing agent in solution in the PVC resin. The present invention provides a pressurized mold cavity, and a source of pressure to the cavity of the mold so that the cavity is pressurized when the fitting is being formed. Standard shop air at about 100 psi may provide reasonable results. When the machine nozzle advances and engages with the sprue bushing of the mold the spring nozzle opens and the molten resin/blowing agent mixture is met with the pressurized air. At this point the blowing agent stays in solution and will not be able to release the gas. The resin/blowing agent mixture is injected into the mold and allowed to solidify. An expansion directing sleeve may be added to the fitting either during or after the molding step which sleeve may be used to control the expansion of the fitting when it becomes exposed to a fire. The molded part is now ready to use. When the resin expands as far as it will the PVC resin will begin to degrade and form a foamed carbon mass. Because the blowing agent has been mixing in thoroughly with the plastic melt, the cell class of the fitting will not be affected in the latent state the blowing agent is essentially invisible. Further the preferred blowing agent readily disperses within the melt providing uniform and consistent results in terms of the thermal expansion properties of the finished fitting. Some of the mixtures of the prior art are difficult to mix evenly resulting in uneven expansion performance in the event of a fire.

While various preferred embodiments are described above it will be understood by those skilled in the art that various modifications and variations are comprehended by the present invention as encompassed by the attached claims. For example, while the description shows one type of fitting other configurations of molded plastic fittings are possible within the broad scope of the invention, all as discussed above.

The embodiments of the invention in which an exclusive property or privilege is claimed are defined as follows:

1. A pipe fitting comprising:
   a body having a through bore, said body being made from a moldable thermoplastic resin having a blowing agent uniformly dispersed therein, said blowing agent having a predetermined gas release temperature and said thermoplastic resin having a melting temperature above the predetermined gas release temperature of the blowing agent;
   wherein when exposed to a fire said blowing agent first begins to release gas and the resin softens as the resin is heated until the resin is soft enough for the released gas to expand the plastic to form a foam to close said through bore before a char is formed on said expanded body by said fire.

2. The pipe fitting as claimed in claim 1 further including an expansion directing sleeve to direct fire related expansion of said pipe fitting inwardly to seal off said through bore.

3. The pipe fitting of claim 2 wherein said sleeve is further sized and shaped to permit said body to expand outwardly as well as inwardly.

4. The pipe fitting of claim 3 wherein said body has a first length and said sleeve has a second length shorter than said first length to permit said body to expand outwardly upon being exposed to heat from a fire in a region where said body is not encompassed by said sleeve, as well as inwardly in a region that is encompassed by said sleeve.

5. The pipe fitting of claim 2 wherein said expansion directing sleeve is located around an outer periphery of said body.

6. The pipe fitting of claim 2 wherein said sleeve is made from a fire proof material.

7. The pipe fitting of claim 6 wherein said fire proof material is selected from the group of metal, Ultem or Ryton.

8. The pipe fitting of claim 1 wherein said fitting takes the form of a double bell ended fitting having a through bore.

9. The pipe fitting of claim 8 wherein said through bore has a radius of R and a fitting wall defining the through bore has a plastic thickness of T and said combination of said thermoplastic resin and said blowing agent has an expansion factor of X, wherein TX is greater than R.

10. The pipe fitting of claim 1 wherein said combination of thermoplastic resin and blowing agent has an expansion factor of between 3 and 5.

11. The pipe fitting of claim 1 wherein said combination of thermoplastic resin and blowing agent has an amount of blowing agent of between 2% and 5% by weight.

12. The pipe fitting of claim 11 wherein said blowing agent is in the form of a powder which is added to the thermoplastic resin.

13. The pipe fitting of claim 12 wherein said blowing agent releases gas when heated by the heat of a fire.

14. The pipe fitting of claim 12 wherein said blowing agent is baking soda.

15. The pipe fitting of claim 12 wherein said blowing agent is an endothermic material which releases gas as it is heated.

16. The pipe fitting of claim 1 or 2 wherein said body includes additional material on an outside diameter of said body to ensure that said body expands inwardly to fire proof said through bore.

17. A method of forming a pipe fitting comprising the steps of:
   adding a blowing agent to a thermoplastic material to form a mixture;
   heating the mixture under pressure to form a thermoplastic melt with a uniform dispersion of said blowing agent;
   extruding the thermoplastic melt through a spring nozzle into a pressurized mold;
   forming a pipe fitting from the thermoplastic melt in said mold, the pipe fitting comprising a body having a through bore;
   curing said pipe fitting under pressure within said mold; and
   releasing said pipe fitting from said mold and said pressure only after said pipe fitting is substantially cured.

18. The method of forming a fire fitting as claimed in claim 17 further including the step of adding an expansion directing sleeve to said pipe fitting.

19. The method of forming a pipe fitting as claimed in claim 18 wherein said sleeve is added during said molding step.

20. The method of molding a pipe fitting as claimed in claim 18 wherein said sleeve is added after said pipe fitting has been removed from said mold.

\* \* \* \* \*